UNITED STATES PATENT OFFICE.

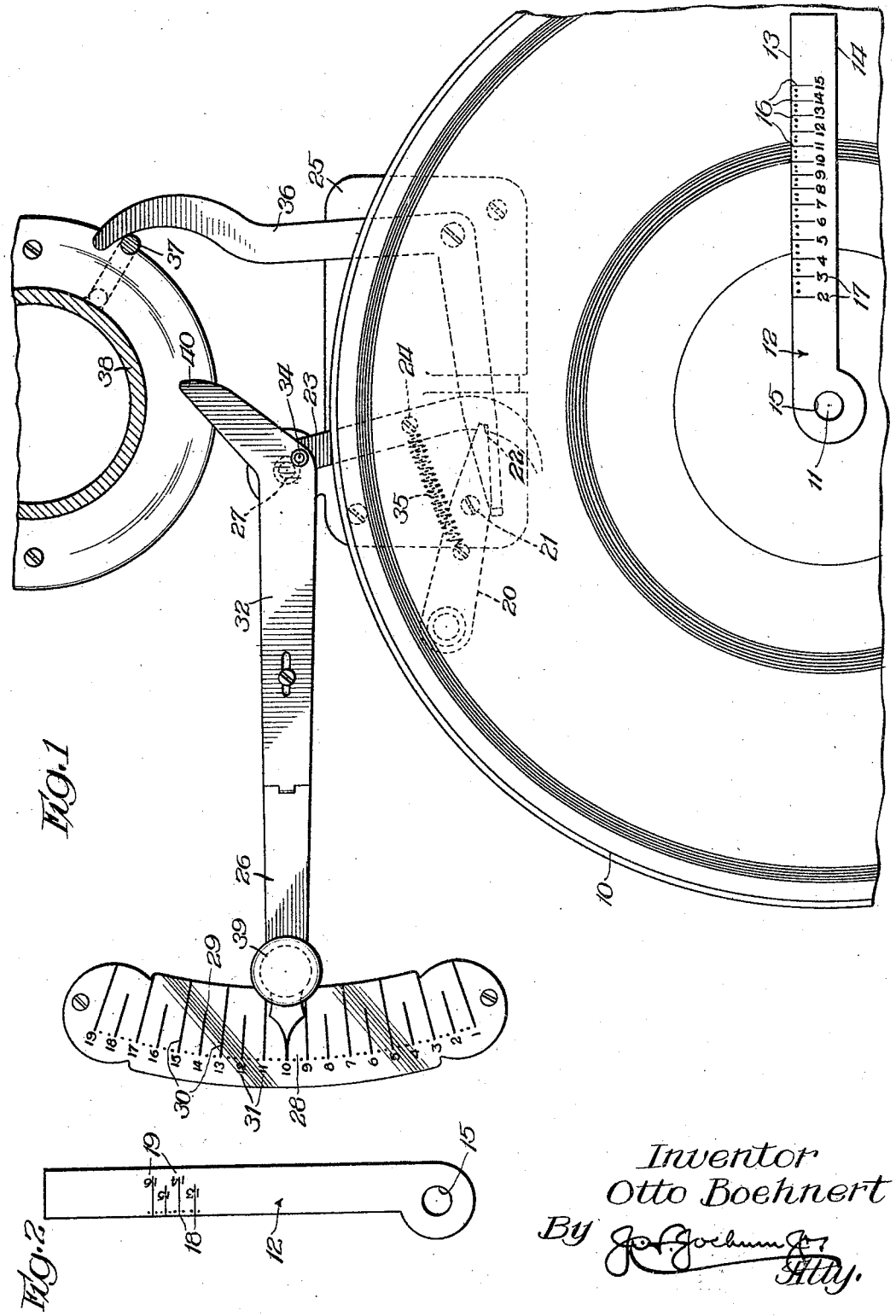

OTTO BOEHNERT, OF CHICAGO, ILLINOIS, ASSIGNOR TO VITANOLA TALKING MACHINE COMPANY, OF CHICAGO, ILLINOIS, A CORPORATION OF ILLINOIS.

INDICATOR OR MEASURING GAGE FOR DISK RECORDS.

1,398,710.     Specification of Letters Patent.     Patented Nov. 29, 1921.

Application filed April 19, 1920. Serial No. 374,914.

*To all whom it may concern:*

Be it known that I, OTTO BOEHNERT, a citizen of the United States, residing at Chicago, in the county of Cook and State of Illinois, have invented certain new and useful Improvements in Indicator or Measuring Gages for Disk Records, of which the following is a specification.

This invention relates to improvements in measuring gages particularly adapted for use with disk playing machines for ascertaining or measuring the exact point with respect to the groove or piece on the disk at which it is desired that the automatic brake or stop device shall become effective to stop the playing of the record.

A further object is to provide an improved gage or indicator of this character adapted for use with different types of records, that is with records having what is known as "lateral sound waves" as well as records having what is known as "hill and dale" sound waves.

To the attainment of these ends and the accomplishment of other new and useful objects as will appear the invention consists in the features of novelty in substantially the construction, combination and arrangement of the several parts hereinafter more fully described and claimed and shown in the accompanying drawing illustrating this invention and in which—

Figure 1 is a top plan view of a portion of a disk record having a device of this character applied thereto and also illustrating a portion of a brake or stop mechanism.

Fig. 2 is a plan view of the side of the indicator or measuring gage opposite to that shown in Fig. 1.

Referring more particularly to the drawing the numeral 10 designates a disk record of the ordinary and well known type which is mounted to revolve with the usual support and which latter is provided with an upwardly projecting post 11 that projects through the usual aperture at the center of the disk. The indicator or measuring gage may be of any desired size and configuration and is provided with a body portion 12 preferably having straight lateral edges 13 and 14 and is provided adjacent one end with an aperture 15 that is adapted to receive the post 11 of the record support. The body 12 is provided with a series of graduations 16 along one of its lateral edges and these graduations are provided with suitable indicating characters 17. The graduations 16 are so spaced from each other as to indicate or measure the distance of the termination of the sound groove of the record from the axis of rotation of the disk or from the outside of the disk inwardly. In use the gage is preferably placed in position by passing the apertured end thereof over the post 11 so that the gage will rest flat upon the disk and in this position the graduations or indications 16 will indicate the distance of the groove from the post 11. A second series of graduations 18 having indicating characters 19 may also be provided on the body portion 12 preferably on the opposite side of the body to the side on which the graduations 16 occur. The object in providing these two sets of graduations is to indicate or measure the grooves of the different types of records, that is to say, one set of graduations is adapted to measure the point of termination of the sound grooves of the "lateral wave" type, while the other set of graduations is employed to measure the point of termination of the sound groove from the axis of the rotation of the disk of the "hill and dale" type, or from the outside of the disk inwardly.

Coöperating with the indicator or gage just described is any automatic brake or stop device but for the purpose of illustrating there is shown and briefly described a type of automatic brake or stop device which constitutes no part of the present invention but is shown for the purpose of illustrating the adaptability of the present invention. The specific construction and operation of the brake mechanism, however, constitutes the subject matter of an application filed by Samuel L. Schiff, Serial No. 374,881.

The brake or stop device embodies a brake element 20 pivotally supported at 21 having one end 22 coöperating with a latch 23 which latter is pivotally supported as at 24 upon a base plate 25. An indicator arm 26 is pivotally connected at 27 with the plate 25 and the point of pivotal connection is so constructed that the indicator arm will be frictionally held in any of its adjusted positions. The indicator is provided with a pointer 28 coöperating with a gage 29 having a series of graduations 30 provided with a series of indications 31, and these indications 31 coöperate with the indications 16 and 18 on the indicator or measuring gage 12. Mounted upon the indicator arm 26 is a tripping element 32 pivotally connected as at 34 with one end of the latch 23. An elastic member 35 connects the latch 23 and brake 20 and tends normally to move them in directions to become effective. A setting lever 36 is provided for setting the brake 20 in an ineffective position and in a position to be engaged and locked by the latch 23. The tripping element 32 and the setting lever 36 are adapted to be actuated by an arm or finger 37 carried by the tone arm 38. A handle 39 may be provided for moving the indicator arm 26.

When it is desired to use the present invention, the brake 20 is tripped by causing the arm or finger 37 to engage or move the tripping element 32 with respect to the indicator arm 26 and this will shift the latch 23 to allow the spring 35 to cause the brake to become effective. The disk support will then be maintained at rest. The disk is then placed upon the support in the usual manner and the indicator or measuring gage when used in the manner as shown in the drawing is placed upon the disk in the manner already described, that is so that it will rest flat upon the disk with the post 11 projecting through the opening 15. The operator then ascertains by the graduations 16, or 18, which ever set is in use, the exact distance from the axis of rotation of the disk to the end of the sound reproducing groove on the disk, which, in the illustration shown in Fig. 1 is indicated by the indication character "10". Having ascertained this fact, the operator then swings the indicator arm 26 about its pivot 27 until the point on the arm registers with the indications 10 of the series 31 on the gage 29. This will adjust the end 40 of the tripping element 32 into a position that it will be engaged at the desired point in the movement or travel of the tone arm 38, so as to release the brake 23 at the proper point when the stylus or needle has reached the end of the sound reproducing groove on the record.

While the preferred form of the invention has herein been shown and described, it is to be understood that various changes may be made therein and it is also to be understood that this device is well adapted for use with any form of automatic brake or stop device for sound reproducing machines.

What is claimed as new is:

1. An indicator or measuring gage for use with disk records for measuring or indicating the point of termination of the sound grooves on the record, in combination with brake or stop mechanism, and means coöperating with the said indicator or gage whereby the said mechanism may be set to be correspondingly rendered active, the said means embodying a dial and pointer, said dial and indicating means having coöperating graduations thereon.

2. An indicator or measuring gage for use with disk records for measuring or indicating the point of termination of the sound grooves on the record, in combination with brake or stop mechanism, means coöperating with the said indicator or gage whereby the said mechanism may be set to be correspondingly rendered active, the said means embodying a dial and pointer, said dial and indicating means having coöperating graduations thereon, and separate series of graduations on the said indicator or gage whereby said indicator or gage will be adapted for use with different types of disk records.

3. An indicator or measuring gage for use with disk records for measuring or indicating the point of termination of the sound grooves on the record, in combination with brake or stop mechanism, means embodying a dial and pointer coöperating with the said indicator or gage whereby the said mechanism may be set to be correspondingly rendered active, and means at one end of the indicator or gage for anchoring the same, the said dial and the indicator having coöperating graduations thereon.

4. An indicator or measuring gage for use with disk records for measuring or indicating the point of termination of the sound grooves on the record, in combination with brake or stop mechanism, means embodying a dial and a pointer coöperating with the said indicator or gage whereby the said mechanism may be set to be correspondingly rendered active, the said dial and indicator having coöperating graduations thereon, and means at one end of the indicator or gage for temporarily anchoring said end, the last recited means embodying an aperture in the indicator or gage and into which aperture the disk holding post projects.

5. In combination, a brake or stop device for sound reproducing machines, means for automatically rendering the same effective, the said means embodying a dial and pointer and means separate from and independent of the said parts for ascertaining the exact point with respect to the sound grooves of the record at which the said brake or stop device will become effective the last recited means and the said dial having coöperating graduations thereon.

In testimony whereof I have signed my name to this specification on this 12th day of April, A. D. 1920.

OTTO BOEHNERT.